US012586943B2

(12) United States Patent
Meyrose

(10) Patent No.: US 12,586,943 B2
(45) Date of Patent: Mar. 24, 2026

(54) CONTACT ELEMENT WHICH CAN BE PRODUCED WITHOUT BURRS

(71) Applicant: HARTING ELECTRIC STIFTUNG & CO. KG, Espelkamp (DE)

(72) Inventor: Timm Meyrose, Espelkamp (DE)

(73) Assignee: HARTING ELECTRIC STIFTUNG & CO. KG, Espelkamp (DE)

(*) Notice: Subject to any disclaimer, the term of this patent is extended or adjusted under 35 U.S.C. 154(b) by 253 days.

(21) Appl. No.: 18/041,969

(22) PCT Filed: Aug. 6, 2021

(86) PCT No.: PCT/DE2021/100676
§ 371 (c)(1),
(2) Date: Feb. 16, 2023

(87) PCT Pub. No.: WO2022/037745
PCT Pub. Date: Feb. 24, 2022

(65) Prior Publication Data
US 2024/0030638 A1 Jan. 25, 2024

(30) Foreign Application Priority Data
Aug. 19, 2020 (DE) ..................... 10 2020 121 701.3

(51) Int. Cl.
*H01R 13/04* (2006.01)
*H01R 4/58* (2006.01)
*H01R 13/03* (2006.01)

(52) U.S. Cl.
CPC ............... *H01R 13/04* (2013.01); *H01R 4/58* (2013.01); *H01R 13/03* (2013.01)

(58) Field of Classification Search
CPC .......... H01R 13/03; H01R 13/04; H01R 4/58; H01R 4/183; H01R 11/12; H01R 43/16
(Continued)

(56) References Cited

U.S. PATENT DOCUMENTS 3,315,220 A * 4/1967 Flanagan ............... H01R 13/04 D13/133
3,980,387 A 9/1976 Neidecker
(Continued)

FOREIGN PATENT DOCUMENTS

CN 203445261 U 2/2014
CN 203800196 U 8/2014
(Continued)

OTHER PUBLICATIONS

International Preliminary Report on Patentability, dated Feb. 16, 2023, for International Patent Application No. PCT/DE2021/100676. (8 pages).
(Continued)

*Primary Examiner* — Christopher M Koehler
*Assistant Examiner* — Gregory L Mangot
(74) *Attorney, Agent, or Firm* — Seed Intellectual Property Law Group LLP

(57) ABSTRACT

An electrical contact element is provided which particularly has a lead content of less than or equal to 0.1% by weight. The contact element has at least one first region and at least one contiguous second region, and an at least partly peripheral groove is provided between the first region and the second region. The contact element can thus be produced without burrs.

19 Claims, 3 Drawing Sheets

(58) Field of Classification Search
USPC .......................................................... 439/887
See application file for complete search history.

(56) References Cited

U.S. PATENT DOCUMENTS

| | | | | | |
|---|---|---|---|---|---|
| 4,039,244 | A * | 8/1977 | Leachy | H01R 43/16 439/879 |
| 4,660,922 | A * | 4/1987 | Cooney | H01R 13/04 439/889 |
| 4,723,925 | A * | 2/1988 | Orr, Jr. | H01R 12/718 439/83 |
| 5,575,666 | A * | 11/1996 | Dent | H01R 12/585 D13/133 |
| 5,823,824 | A * | 10/1998 | Mitamura | H01R 13/6593 439/585 |
| 6,039,614 | A * | 3/2000 | Ramari | H01R 13/20 439/846 |
| 7,344,396 | B2 * | 3/2008 | Stagi | H01R 13/5202 439/204 |
| 9,673,578 | B1 * | 6/2017 | Lane | H01R 13/631 |
| 2003/0092325 | A1 * | 5/2003 | Schad | H01R 4/36 439/877 |
| 2008/0107016 | A1 | 5/2008 | Tang | |
| 2010/0072923 | A1 | 3/2010 | Holland et al. | |
| 2012/0298645 | A1 * | 11/2012 | Kleespiess | H01R 4/029 219/137 R |
| 2019/0107230 | A1 * | 4/2019 | Vaccaro | H01R 13/5202 |
| 2019/0214779 | A1 | 7/2019 | Beck | |
| 2020/0328569 | A1 * | 10/2020 | Bossuyt | H01R 4/58 |
| 2021/0075147 | A1 * | 3/2021 | Drmota Petric | H01R 13/5845 |
| 2021/0215741 | A1 * | 7/2021 | Wei | H01R 13/2421 |
| 2021/0320446 | A1 | 10/2021 | Wellmann et al. | |
| 2023/0050927 | A1 * | 2/2023 | Wenz | B60L 53/16 |

FOREIGN PATENT DOCUMENTS

| | | | |
|---|---|---|---|
| CN | 105990729 | B | 8/2018 |
| CN | 109004480 | A | 12/2018 |
| DE | 2832003 | A1 | 2/1979 |
| DE | 102013009131 | A1 | 12/2013 |
| DE | 102016217673 | A1 | 3/2018 |
| DE | 102018100440 | A1 | 7/2019 |
| EP | 0240642 | A1 | 10/1987 |
| EP | 0345512 | A2 | 12/1989 |
| WO | WO 2020043231 | A1 | 3/2020 |

OTHER PUBLICATIONS

International Search Report and Written Opinion, mailed Nov. 25, 2021, for International Patent Application No. PCT/DE2021/100676. (12 pages) (with English translation of International Search Report).

Office Action, dated Jun. 7, 2021, for German Patent Application No. 10 2020 121 701.3 (8 pages).

* cited by examiner

CONTACT ELEMENT WHICH CAN BE PRODUCED WITHOUT BURRS

BACKGROUND

Technical Field

The disclosure relates to a contact element.

Contact elements are contacted with an appropriate mating contact element in order to transmit electrical currents or electrical power. The contacts elements are employed, for example, in plug connectors but can also be installed on so-called busbars. Such plug connectors and mating plug connectors are used in order to produce an electrical and mechanical connection between two electrical lines or an electrical line and a device, in particular in an industrial environment.

Description of the Related Art

WO 2020/043231 A1 discloses a plug connector consisting of a plug connector housing and at least one electrical contact element, wherein the plug connector housing and/or the electrical contact element has/have a lead content of <0.1% by weight.

WO 2020/043231 A1 also discloses a production method for so-called lead-free contact elements. For this purpose, a revolving transfer machine is used which has a plurality of workstations which perform in particular machining working steps on a workpiece. A lead-free material refers below to a material with a lead content equal to or less than 0.1% by weight.

The abovementioned contact elements are made from lead-free material and thus accord with the prevailing environmental awareness. In particular machining working steps are used when producing such contact elements.

The typical machining processes include drilling, milling, turning, and sawing. The excess material resulting from the processing is removed in the form of chips. Chips or material not removed cleanly which still adhere to the workpiece or have not become detached from the latter after processing are referred to as burrs.

It has been shown that there is a high degree of burr formation in the case of lead-free materials, and the workpieces, in contrast to workpieces made from material containing lead, must be subject to a further deburring working step before they can be employed.

BRIEF SUMMARY

An object of the present disclosure consists in proposing a contact element which has an environmentally friendly design and is simple to manufacture.

The electrical contact element according to an embodiment of the invention has at least one first region and at least one second region. The two regions adjoin each other. Expressed differently, the two regions abut each other although the component here is preferably a one-piece component.

The first region is preferably designed with an essentially cylindrical shape, whereas the second region is preferably designed with an essentially cuboid shape.

The essentially cuboid shape of the second region in particular means that the second region can still have a partially cylindrical shape, wherein two flat opposing side faces have been milled or incorporated into the original cylinder. The two remaining side faces furthermore correspond to the partial outer surface of the original cylinder and are also referred to below as arched faces.

The first region of the contact element preferably comprises the plug-in region and is then provided for electrically contacting a mating contact element. The second region of the contact element preferably comprises the connection region and is then provided for electrically contacting an electrical conductor or for electrically contacting a busbar.

According to an embodiment of the invention, the first region and the second region are separated from each other by an at least partially circumferential groove. The groove borders the abutment face between the two regions at least partially. Without the groove, subsequent working steps such as brushing, water-jet deburring, or vibratory grinding would have to be performed on the workpiece which would increase the overall manufacturing complexity and hence make the product more expensive.

The contact element can also have more than two regions and accordingly a plurality of grooves according to an embodiment of the invention. A first region and a second region can be separated from each other by an at least partially circumferential groove. A third region can, for example, be arranged adjacent to the second region and be separated therefrom by a groove according to an embodiment of the invention. If the second region has an essentially cuboid embodiment, the third region may be designed with a cylindrical shape. In embodiments of the present invention, two adjacent regions may have a correspondingly different geometrical embodiment and may be separated from each other by a groove.

The contact element may be made from a material with a low lead content (equal to or less than 0.1% by weight). In some embodiments, the contact element may be advantageously made from:

- a copper/zinc alloy (CuZn) with a zinc content of 35% by weight to 42% by weight, or
- a copper/tin alloy (CuSn) with a tin content of 4% by weight to 8% by weight, or
- a copper/nickel alloy (CuNi) with a nickel content of 0.5% by weight to 30% by weight, or
- a copper/nickel/zinc alloy (CuNiZn) with a nickel content of 10% by weight to 20% by weight and with a zinc content of 20% by weight to 30% by weight, or
- copper or a low-alloy copper with additives up to 3% by weight.

Contact elements with the desired mechanical and electrical properties can be produced from these materials. The machinability for producing contact elements is not optimal in the case of these materials. Burrs often occur which typically need to be removed in additional working steps.

The formation of burrs in the boundary region between the first and the second region is effectively prevented by the groove according to embodiments of the invention. In the production process for the contact element, the groove can be provided in a working step at a workstation in parallel, i.e., at the same time as other working steps, and consequently does not entail any significant extra complexity or extra costs.

The first region and the second region are advantageously separated from each other by a completely circumferential groove. The groove also separates these regions visually. A completely circumferential groove is not necessary in order to suppress the formation of chips. The groove would only need to extend in the regions in which burrs occur. This is in particular the case when a component has faces which abut each other at an acute angle. However, a circumferential groove has advantages in terms of manufacturing technology because the component is rotationally symmetrical and it is simpler to form a circumferential groove, without withdrawing the processing tool, than a partially circumferential groove.

In a particularly advantageous embodiment of the invention, the circumferential groove has a V-shaped cross-section. The sides of the V-shaped cross-section can here be designed with equal sides or unequal sides. Such a groove can be easily formed using a simple tool and a correspondingly simple working step.

The sides of the V-shaped cross-section may advantageously enclose an angle of between 25° and 120°, or an angle of between 60° and 90°. It has been shown that no burr is formed on the workpiece or contact element with these angular positions.

The groove can alternatively have a chalice-shaped cross-section. Chalice-shaped here means that the sides of the cross-section are designed so that they are curved at least in one region. This curvature is preferably formed in the upper or outer region of the groove. As a result, the formation of burrs on the workpiece as a whole and in particular also along the groove can be prevented in particular in the case of relatively deep grooves.

In a further alternative embodiment of the invention, the cross-section of the groove has two geometrically different sides, wherein one side can be designed so that it is straight, similar to the V-shape, and the other side can be designed so that it is curved, similar to the chalice shape. Depending on the depth of the groove, this geometry can effectively prevent the formation of burrs.

In embodiments, the groove may have a depth which corresponds to no more than 25% of the external diameter of the first region of the contact element. It has been shown that such a groove depth prevents the formation of burrs and the electrical properties of contact elements for industrial plug connectors, also called heavy-duty plug connectors, are not significantly affected.

It is, however, advantageous to choose a groove depth of no more than 10% of the external diameter of the first region of the contact element. As a result, the formation of burrs is also prevented and the electrical properties of the contact elements, such as for example the current-carrying capacity, are not affected. The absolute depth of the groove is advantageously between to no more than 10 mm, the edge regions being included in the depth range.

An extremely flat groove has advantages if the contact element is then coated with a precious metal or a precious metal alloy in order to improve the conductivity and in particular the current-carrying capacity.

The contact element according to an embodiment of the invention is preferably a so-called pin contact element. In a particularly advantageous embodiment of the invention, the first region tapers conically at least in some regions toward the end of the contact element. This means that the diameter of the contact element reduces toward the end, viewed in the plug-in direction. As a result, a mating contact element, generally a socket contact, can be contacted simply.

The first and the second region preferably have a boundary region in which the two regions merge. In purely visual terms, the two regions abut each other in the boundary region. The first region here has a diameter which corresponds to an edge length of the second region. Colloquially, it could be said that the two regions are designed in the boundary region so that they are as "thick" as each other, although this term is not geometrically accurate for a cuboid. The transition between the two regions is homogeneous and, apart from the groove according to embodiments of the invention, has no discontinuities, which is advantageous for the current-carrying capacity of the contact element.

The groove or grooves according to embodiments of the invention is or are advantageously in each case so-called external grooves. The grooves are incorporated into the outer surface of the contact element. Because the groove is introduced into solid material by a machining working step, it is also called a machined groove or flute. Such a flute differs from grooves which are produced, for example, by stamping techniques, for example in the case of a contact element which has been produced in a stamping and bending process.

Such grooves can be introduced easily in the manufacturing process. However, care must be taken regarding the influence of the grooves on the current-carrying capacity. As is known, the current-carrying capacity of a contact element is greatly affected by its surface, in particular the surface geometry.

During the production of a contact element according to an embodiment of the invention,

- a workpiece of a suitable length is first cut off from a reel of wire;
- an at least partially circumferential groove which separates a first region and a second region from each other is then provided on the workpiece; and
- in parallel or subsequently, the first region is formed for contacting a mating contact element and the second region for electrically contacting a conductor or a busbar.

Alternatively, a bar is set in rotation and the workpiece is given the shape according to embodiments of the invention. A plurality of contact elements according to an embodiment of the invention can be manufactured from a single bar.

The workpiece may be manufactured from a copper/zinc alloy, wherein the lead content of this alloy is less than or equal to 0.1% by weight.

Upon completion of the geometrical shaping of the contact element, in a galvanic process a pure silver, silver alloy, pure gold, or gold alloy coating may be deposited on its surface.

BRIEF DESCRIPTION OF THE SEVERAL VIEWS OF THE DRAWINGS

Embodiments of the invention are illustrated in the drawings and explained in detail below. In the drawings.

The drawings may contain partly simplified schematic illustrations. Identical reference symbols are partly used for the same but possibly not identical elements. Different views of the same elements could be to a different scale.

DETAILED DESCRIPTION

Figure 1:
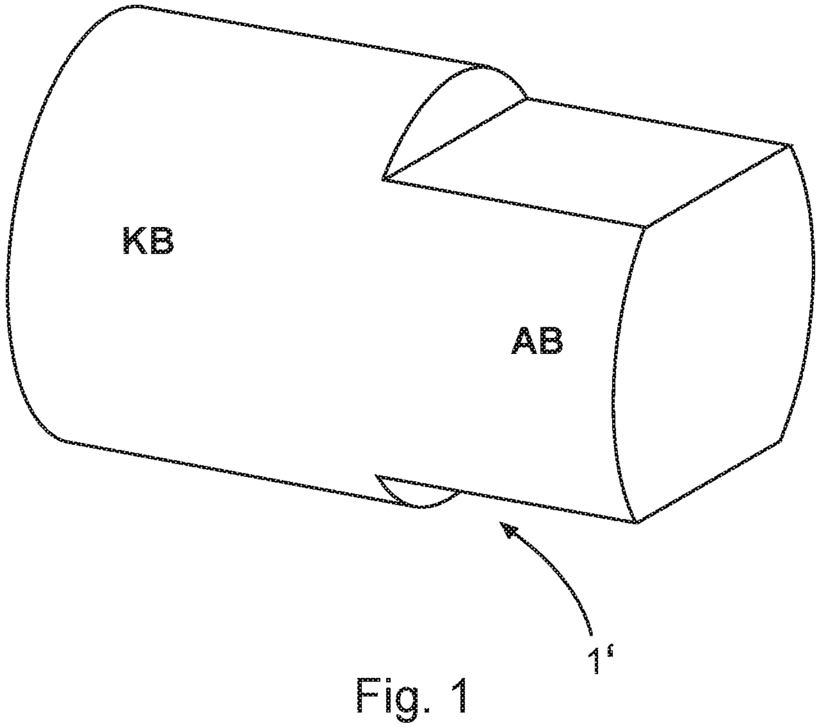
FIG. 1 shows a perspective detail of a contact element.
Figure 2:
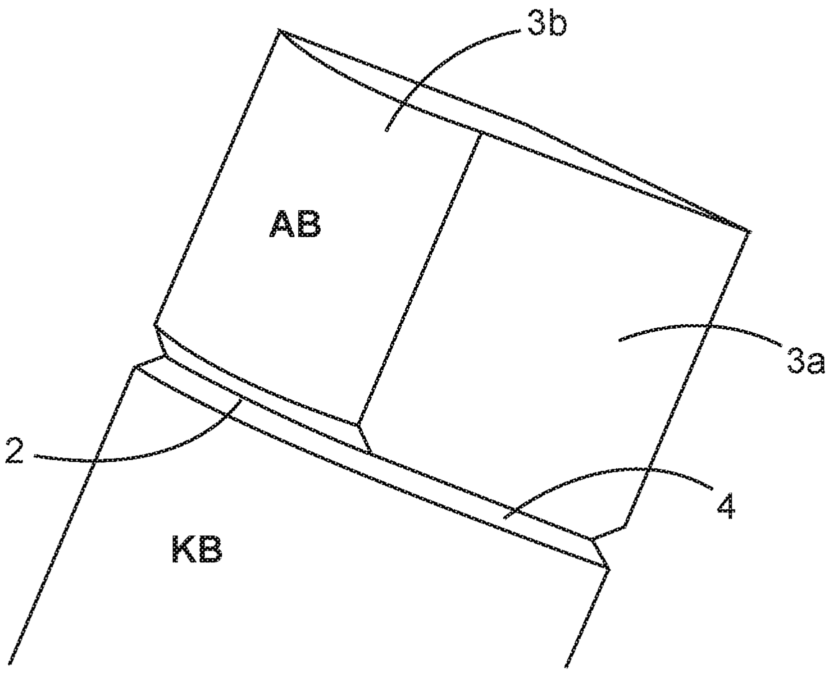
FIG. 2 shows a perspective detail of a contact element according to an embodiment of the invention.

FIGS. 1 and 2 show a perspective detail of a contact element 1, 1'. The contact element 1, 1' consists of a first region KB which is provided for electrically contacting a mating contact element, and a second region AB which is provided for electrically contacting an electrical conductor or an electrical busbar. The two regions AB, KB can only be seen completely in FIG. 3. FIGS. 1 and 2 focus on the part of the contact element 1, 1' in which the two regions AB, KB abut each other. This region is also referred to below as the boundary region.

The first region KB has an essentially cylindrical design, wherein the first region tapers conically on the plug-in side, i.e., toward the tip of the contact. The second region AB has an essentially cuboid design. The diameter D1 of the first region corresponds in the boundary region to an edge length K1 of the second region (K1=D1). The diameter D of the first region KB alters from the boundary region to the tip of the contact. The diameter D of the first region KB does not decrease continuously. The diameter D alternates at least once in this region, i.e., a preceding diameter D2 is smaller than a following diameter D3.

The second region AB has been shaped from a cylinder, in which two flat side faces 3*a* have been introduced. The remaining arched side faces 3*b* furthermore correspond to the partial outer surface of the original cylinder. The second region AB is consequently designed with an essentially cuboid shape. It has two opposing flat side faces 3*a* and two opposing curved or arched side faces 3*b*. The curvature of the arched side faces corresponds to the curvature of the cylindrical first region KB.

It can be seen in FIG. 2 that an at least partially circumferential groove 2 is provided in the boundary region, i.e., between the first region KB and the second region AB. Where the second region AB has in each case its flat side faces 3*a*, the groove 2 runs on just one side. In this case, on one side means that a bevel 4 is present on the first region KB. This bevel 4 has the same geometry or design as the associated side cross-section of the groove 2. The groove 2 continues to run as it were homogeneously in the region of the bevel 4 such that it is also possible to refer to a completely circumferential groove 2, 4. The bevel 4 is left over from the completely circumferential groove which has been provided on the workpiece before the flat side faces 3*a* have been formed.

Figure 3:
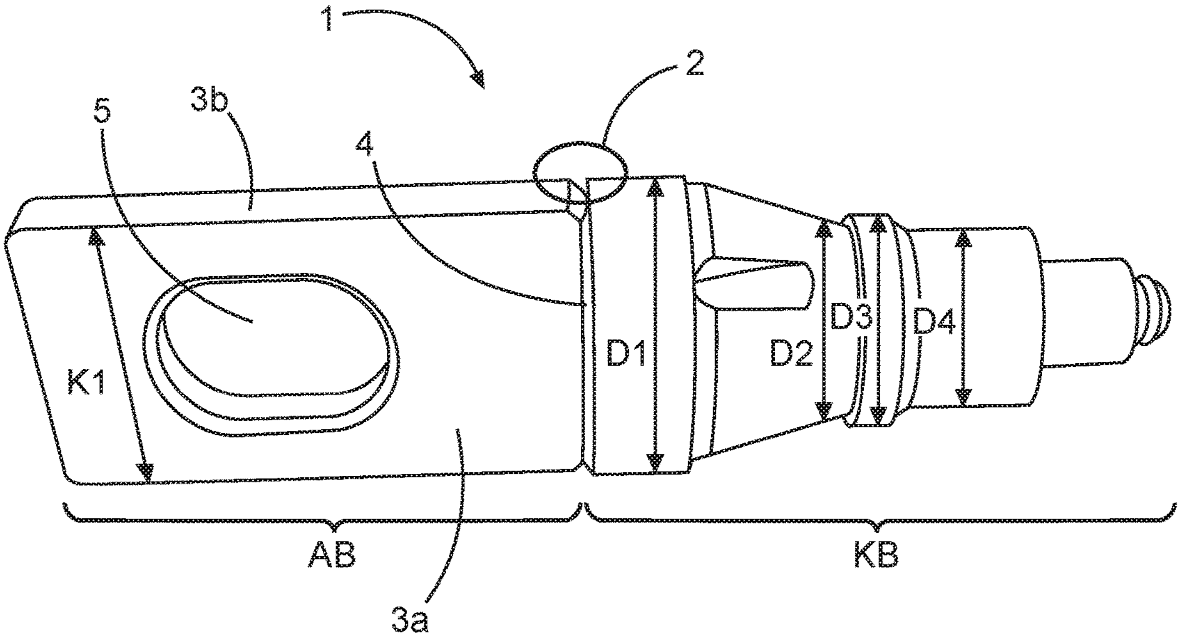
FIG. 3 shows a perspective illustration of a contact element according to an embodiment of the invention.

It can be seen in FIG. 3 that the contact element 1 has a through hole 5 in the second region AB. The contact element 1 can be fastened conductively to a busbar (not shown) via this. Alternatively, however, a screw fastening or a crimped connection for an electrical conductor could also be provided in the second region.

Figure 4:
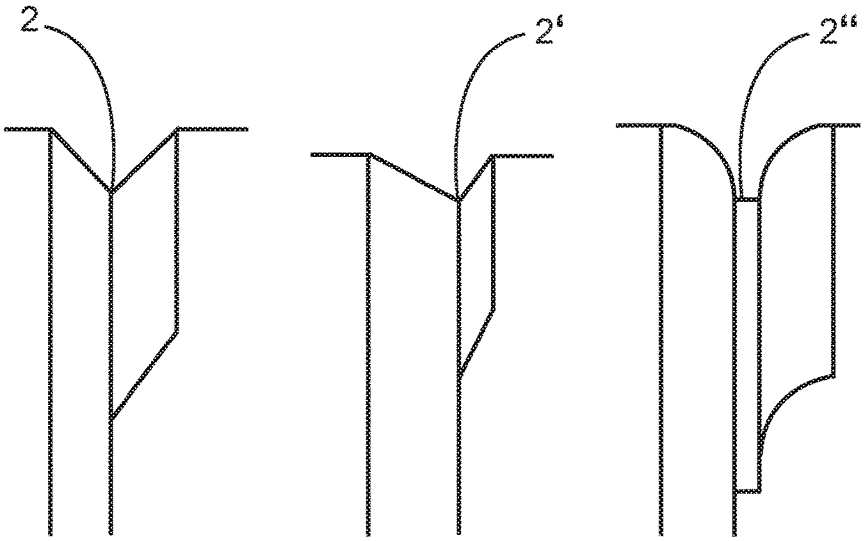
FIG. 4 shows different cross-sections of a groove according to embodiments of the invention.

Three different cross-sections of a groove 2, 2', 2" according to embodiments of the invention can be seen in FIG. 4. In the first example (on the left in FIG. 4), the groove 2 has a V-shaped cross-section, wherein the sides of the V-shape are designed as equal sides and enclose a angle. In the second example (in the middle in FIG. 4), the groove 2' also has a V-shape, wherein the sides of the V-shape are designed as unequal sides. Here too the sides enclose an angle of 90°. In the third example (on the right in FIG. 4, the groove 2" has a chalice-shaped cross-section, wherein the sides are designed as curved and symmetrical.

Any permutation of the sides of the groove cross-sections shown in FIG. 4 is possible. All the relevant types of groove would, as desired, prevent the formation of burrs on the contact element 1.

Figure 5:
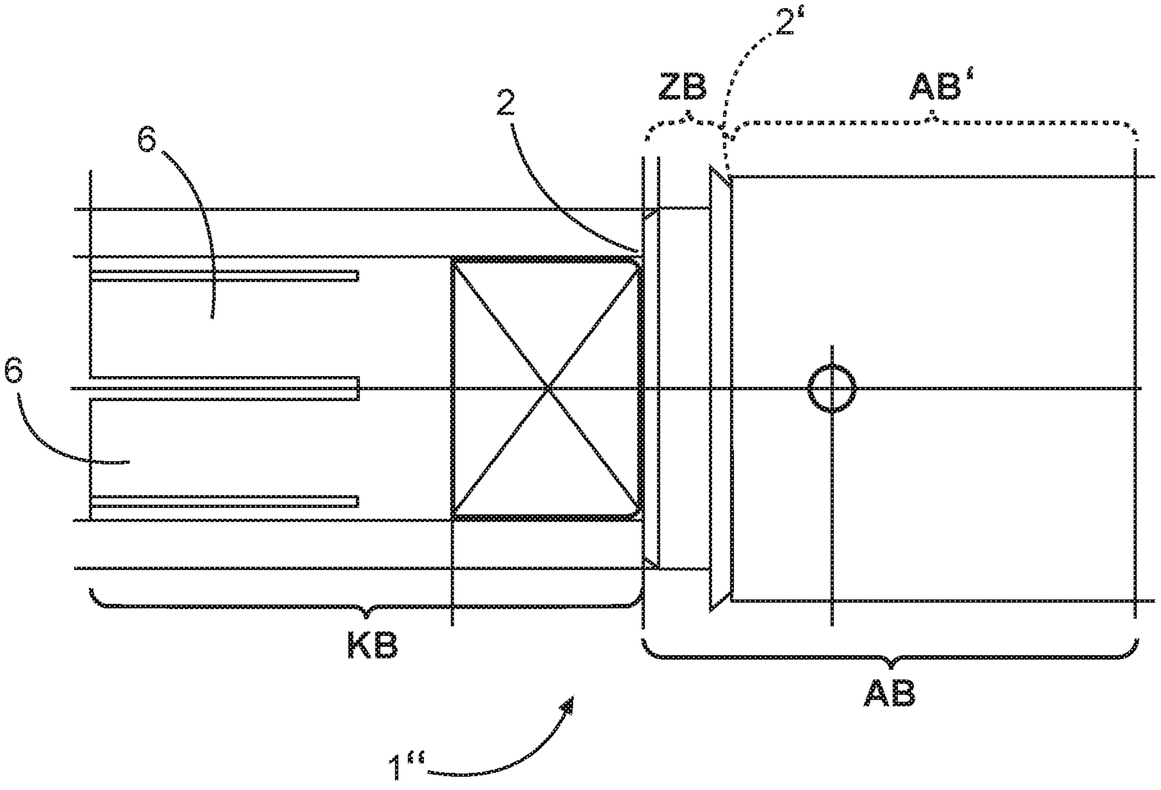
FIG. 5 shows a technical drawing of an alternative contact element according to an embodiment of the invention.

An alternative structure of a contact element 1" according to an embodiment of the invention is shown in FIG. 5. The contact element 1" is configured as a socket contact. Individual axially protruding fins 6 which engage around a pin contact in its contact region are therefore integrally formed in the first region KB in the so-called contact region. A circumferential groove 2 is provided between the first region KB and the second region AB in order to prevent the formation of burrs during production at this location.

The first region KB of the contact element 1" is configured with an essentially cylindrical shape, wherein the fins 6 form a cylindrical shell which is interrupted between the fins 6 only by an axially extending slot.

The second region AB can have the shape of a double cylinder (two cylinders placed one on top of the other).

Alternatively, one element of the connection region of the contact element can be configured as a cuboid and the element connected thereto as a cylinder. It would then be expedient in terms of production technology to further divide the connection region into a second region AB and a third region ZB, as indicated by way of example in FIG. 5 in dashed lines. A circumferential groove 2' would then be provided between the second region AB and the third region ZB. In this case, a contact element 1" would then have two grooves 2, 2' which can be designed as completely or partially circumferential.

Even though different aspects or features of embodiments of the invention are shown in the drawings in each case in combination, unless otherwise stated, it is clear to a person skilled in the art that the combinations illustrated and discussed are not the only ones possible. In particular, corresponding units or groups of features from different exemplary embodiments can be interchanged. Put another way, aspects of the embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical contact element, comprising:

at least one first region and at least one second region adjoining the at least one first region, wherein the at least one first region is provided at a plug-in end of the electrical contact element, which includes a tip of the contact element, wherein the at least one second region is provided at a base end of the of the electrical contact element, wherein adjacent to a boundary region where the at least one first region joins the at least one second region, the at least one first region is designed with a cylindrical or cylindrical-like shape, and the at least one second region is designed with a cuboid or cuboid-like shape having a first pair of opposing side faces and a second pair of opposing side faces that are wider than the first pair of opposing side faces, wherein a circumferential groove is provided between the at least one first region and the at least one second region, wherein the circumferential groove defines a root that is offset radially inward relative to each of a radially outward most surface of the at least one first region and a radially outward most surface of the at least one second region, wherein the circumferential groove has opposing groove sides in regions of the circumferential groove that correspond to where the first pair of opposing side faces of the cuboid or cuboid-like shape of the at least one second region adjoin the cylindrical or cylindrical-like shape of the at least one first region, and wherein the circumferential groove has a single groove side in remaining regions of the circumferential groove which presents as a bevel on the at least one first region.

2. The electrical contact element as claimed in claim 1, wherein the circumferential groove has a V-shaped cross-section in the regions of the circumferential groove that correspond to where the relatively narrow side faces of the cuboid or cuboid-like shape of the at least one second region adjoin the cylindrical or cylindrical-like shape of the at least one first region.

3. The electrical contact element as claimed in claim 2, wherein sides of the V-shaped cross-section are designed with unequal sides.

4. The electrical contact element as claimed in claim 2, wherein sides of the V-shaped cross-section enclose an angle of between 25° and 120°.

5. The electrical contact element as claimed in claim 2, wherein sides of the V-shaped cross-section enclose an angle of between 60° and 90°.

6. The electrical contact element as claimed in claim 1, wherein the circumferential groove has a chalice-shaped cross-section in the regions of the circumferential groove that correspond to where the relatively narrow side faces of the cuboid or cuboid-like shape of the at least one second region adjoin the cylindrical or cylindrical-like shape of the at least one first region.

7. The electrical contact element as claimed in claim 1, wherein one side of the opposing groove sides of the circumferential groove is designed so that it is straight and the other side is designed so that it is curved.

8. The electrical contact element as claimed in claim 1, wherein the at least one first region is provided for electrically contacting a mating contact element, and wherein the at least one second region is provided for electrically contacting an electrical conductor or an electrical busbar.

9. The electrical contact element as claimed in claim 1, wherein the circumferential groove has a depth which corresponds to no more than 25% of an external diameter of the at least one first region of the contact element.

10. The electrical contact element as claimed in claim 1, wherein the circumferential groove has a depth of 0.01 mm to 10 mm.

11. The electrical contact element as claimed in claim 1, wherein the at least one first region tapers conically at least in some regions toward an end of the contact element.

12. The electrical contact element as claimed in claim 1, wherein in the boundary region the at least one first region has a diameter which is equal to an edge length of the at least one second region.

13. The electrical contact element as claimed in claim 1, wherein the electrical contact element is designed as a single piece.

14. The electrical contact element as claimed in claim 1, wherein the electrical contact element has a lead content equal to or less than 0.1% by weight.

15. The electrical contact element as claimed in claim 1, wherein the contact element is made from:

a copper/zinc alloy with a zinc content of 35% by weight to 42% by weight, or a copper/tin alloy with a tin content of 4% by weight to 8% by weight, or a copper/nickel alloy with a nickel content of 0.5% by weight to 30% by weight, or a copper/nickel/zinc alloy with a nickel content of 10% by weight to 20% by weight and with a zinc content of 20% by weight to 30% by weight, or copper or a low-alloy copper with additives up to 3% by weight.

16. The electrical contact element as claimed in claim 1, wherein the contact element is divided into three regions, a first region, a second region, and a third region, and where a respective groove is provided in each case between the regions.

17. The electrical contact element as claimed in claim 1, wherein the circumferential groove is an external groove.

18. The electrical contact element as claimed in claim 1, wherein the circumferential groove is a flute which is introduced into solid material in a machining working step.

19. The electrical contact element as claimed in claim 1, wherein the circumferential groove has a depth which corresponds to no more than 10% of an external diameter of the at least one first region of the contact element.

* * * * *